United States Patent [19]

Mues et al.

[11] Patent Number: 4,694,065

[45] Date of Patent: Sep. 15, 1987

[54] PROCESS FOR THE PRODUCTION OF DUROMERIC ALIPHATIC POLYCARBONATES

[75] Inventors: Peter Mues; Hans-Josef Buysch; Bert Brassat, all of Krefeld; Heinrich Heine, Leverkusen, all of Fed. Rep. of Germany

[73] Assignee: Bayer Aktiengesellschaft, Leverkusen, Fed. Rep. of Germany

[21] Appl. No.: 815,648

[22] Filed: Jan. 2, 1986

[30] Foreign Application Priority Data

Jan. 16, 1985 [DE] Fed. Rep. of Germany ....... 3501246

[51] Int. Cl.$^4$ ............................................. C08G 63/62

[52] U.S. Cl. ..................................... 528/371; 528/370

[58] Field of Search ....................... 528/371, 370, 196

[56] References Cited

U.S. PATENT DOCUMENTS 3,386,954 6/1968 Schnell et al. ...................... 528/371
4,423,205 12/1983 Rajan .................................. 528/371

*Primary Examiner*—Theodore E. Pertilla
*Attorney, Agent, or Firm*—Connolly & Hutz

[57] ABSTRACT

The invention relates to a novel process for the production of duromeric aliphatic polycarbonates from cyclic aliphatic carbonic esters by ring-opening polymerization.

4 Claims, No Drawings

PROCESS FOR THE PRODUCTION OF DUROMERIC ALIPHATIC POLYCARBONATES

The invention relates to a novel process for the production of duromeric aliphatic polycarbonates from cyclic aliphatic carbonic esters by ring-opening polymerisation.

It is known that cyclic carbonates can be polymerised at elevated temperatures (130° C.) by compounds which react in an alkaline manner, for example potassium carbonate (J. Am. Chem. Soc. 52, 314 (1930)).

Alkali metal compounds, metal alcoholates and amides are mentioned in DE-OS 1 545 116, 1 545 117 and 1 545 118 as particularly suitable catalysts for this reaction which can be used at relatively low temperatures (about 90° C.).

These catalysts are unsuitable for the production of duromeric aliphatic polycarbonates by ring-opening copolymerisation of monofunctional and difunctional, that is to say cross-linking ring carbonates, as they lead to the formation of polyphase systems which do not trigger polymerisation or trigger only uncontrolled polymerisation. This results in non-reproducible polymerisation and products which are unevenly polymerised. In other cases, products containing bubbles are formed during polymerisation owing to marked $CO_2$ separation.

DE-OS 3 103 135 and 3 204 078 describe the use of thallium compounds which react in an alkaline manner for the polymerisation of cyclic carbonates. These catalysts can be used only to a very limited extent for the production of duromeric products as polymerisation does not take place in a reproducible fashion in all cases. However, it is particularly disadvantageous the polymerisation does not take place in the presence of conventional fillers and reinforcing materials for duromers, for example quartz sand and glass fibre with these Tl-compounds.

It was therefore desirable to develop a process which permits reproducible production even of reinforced duromers by ring-opening polymerisation of cyclic carbonic esters.

A process has accordingly been found which permits the production of duromeric, optionally reinforced, aliphatic polycarbonates by ring-opening copolymerisation of monocyclic ring carbonates and difunctional cross-linking ring carbonates by using catalyst systems consisting of a catalyst corresponding to general formula (I)

$$X(R^1)_y \quad (I),$$

wherein
X represents an ion from the groups IA-IIIA, IIIB or VA of the periodic system (Chemiker-Kalender, p. 2, $^2$1974, Springer Verlag),
$R^1$ represents a $C_1$-$C_8$-alkylalcoholate, $C_7$-$C_{15}$-aralkylalcoholate, $C_4$-$C_{18}$-thiolate, cyanide, cyanate, thiocyanate, aliphatic ($C_1$-$C_8$)carboxylate, aromatic (optionally substituted by bromine, chlorine, a $C_1$-$C_4$-alkyl, nitro, trifluoromethyl, alkoxy group containing from 1 to 4 carbon atoms or carbalkoxy group) carboxylate, carbonate, $C_1$-$C_8$-alkyl carbonate, oxide, halide, or $C_1$-$C_4$-alkyl radical,
Y is 1, 2, 3 or 4,
or of a catalyst corresponding to formula (II)

$$R^2-\overset{\overset{\displaystyle S}{\|}}{C}-NH_2, \quad (II)$$

wherein
$R^2$ represents $C_1$-$C_4$-alkyl, $-NH_2$, $-NH$-alkyl($C_1$-$C_4$), $-N(alkyl(C_1$-$C_4))_2$ or $-NHNH_2$
and of a cocatalyst, selected from the group corresponding to one of formulae IIIa, aliphatic acid amides, $$R^3-\overset{\overset{\displaystyle O}{\|}}{C}-NR^4R^5, \quad (IIIa)$$

in which
$R^3$ represents $C_1$-$C_5$-alkyl,
$R^4$ and $R^5$ represent hydrogen or $C_1$-$C_4$-alkyl,
IIIb, cyclic amides (IIIb)

in which
$R^4$ has the meaning given for formula IIIa and
X is an integer of from 3 to 6.
IIIc, cyclic amines (IIIc)

in which
$R^6$ and $R^7$ represent hydrogen, $-CH_3$, $-C_2H_4OH$ or together represent a saturated methylene chain containing from 2 to 4 carbon atoms,
IIId, bicyclic amidines (IIId)

in which
X,Y represent an integer of from 2 to 5,
or IIIe, acyclic and cyclic ureas (IIIe)

in which
$R^8$ to $R^{11}$ represent hydrogen, $C_1$-$C_4$-alkyl, $C_6$-$C_{10}$-aryl wherein the nitrogen atoms can optionally be bonded to one another to form a ring via two radicals $R^8$, $R^{10}$ or $R^9$, $R^{11}$ via a $C_2$ to $C_4$ chain,
or formula (IV)

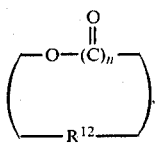

wherein
R$^{12}$ represents —(CH$_2$)$_s$— in which s=2–5 if n=1 and —(CH$_2$CH$_2$O)$_t$CH$_2$CH$_2$— in which t=1–6 if n=0 and
n represents 0 or 1,
or formula (V)

R$^{13}$—ZH  (V), wherein
R$^{13}$ represents —CH$_2$CH$_2$OH, —(CH$_2$CH$_2$)$_v$—OH,

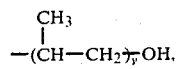

C$_4$–C$_{12}$-alkyl or a phenyl ring (optionally substituted by bromine, chlorine, a C$_1$–C$_4$-alkyl, nitro, trifluoromethyl, alkoxy group containing from 1 to 4 carbon atoms or carbalkoxy-group)
v represents 1 to 200,
Z represents O and S.

Catalysts corresponding to general formula (I) include, for example, the alkali metal alcoholates such as Li-, Na-, K-ethylate, -butylate, -isobutylate, -tert.-butylate, -octylate, -isooctylate, dodecylate, preferably the above-mentioned potassium alcoholates, particularly preferably potassium-tert-butylate, -octylate and -isooctylate; the alkali metal aralkyl alcoholates such as the Li-, Na-, K-salts of benzyl alcohol, α-hydroxy-ethyl-p-ethylbenzene, α-hydroxyethyl-O-ethylbenzene, α-hydroxy-ethyl-o,p-diethylbenzene, α-hydroxyisopropyl-p-tert.-butylbenzene, α-hydroxyisopropyl-p-isopropylbenzene, α-hydroxyisopropyl-p-methylbenzene, α-hydroxy-isopropyl-o,p-di-tert.-butylbenzene, α-hydroxy-isopropyl-o,p-diisopropylbenzene, α-hydroxyisobutyl-p-tert.-butylbenzene, preferably the Na- and K-salts of α-hydroxy-isopropyl-p-isopropylbenzene, α-hydroxy-isopropyl-p-tert.-butylbenzene and α-hydroxy-isopropyl-o,p-di-tert.-butylbenzene; the alkali metal thiolates, such as Na-, K-thiobutanolate, -thiophenolate, -thiododecanolate, -thiostearylate, preferably the above-mentioned potassium thiolates, particularly preferably potassium thiophenolate and thiododecanolate: the alkali metal cyanides, cyanates and thiocyanates such as Li-, La-, K-cyanide, -cyanate and -thiocyanate, particularly preferably K-cyanide, -cyanate and thiocyanate; the alkali metal carboxylates of aliphatic (C$_1$–C$_8$)-monocarboxylic acids and aromatic carboxylates, optionally substituted once or several times by chlorine, bromine, a C$_1$–C$_4$-alkyl, nitro, trifluoromethyl, alkoxy group containing from 1 to 4 carbon atoms or a carbalkoxy group containing from 1 to 4 carbon atoms such as Li-, Na-, K-formiate, -acetate, -caprylate, -isooctanoate, -benzoate, -naphthenates, preferably Li- and K-acetate, isooctanoate and benzoate, particularly preferably K-acetate, K-isooctanoate and Li-benzoate; the alkali metal carbonates such as Li-, Na-, K- and Cs-carbonate, particularly preferably potassium and Cs-carbonate; the C$_1$–C$_8$-monoalkyl ester salts of carbonic acid such as the alkali and alkaline earth metal salts of monomethyl, monoethyl, monobutyl and monoisooctyl carbonates, preferably Li-, K- and Ca-salts of monomethyl, monoethyl and monoisooctyl carbonates, particularly preferably lithium monomethyl carbonate and potassium monoisooctyl carbonate; the oxides of the alkaline earth metals, of cerium, boron, aluminium, thallium and antimony, preferably the oxides of magnesium, calcium, aluminium, thallium (monovalent and trivalent) and antimony (trivalent), particularly preferably calcium oxide, aluminium oxide and antimony (III) oxide; the alkali metal halides such as Na- and K-fluoride and iodide, particularly preferably potassium fluoride and potassium iodide; the methyl, ethyl, n-butyl and isobutyl compounds of lithium, magnesium and aluminium, preferably n-butyl lithium, dimethyl magnesium trimethyl aluminium, triethyl aluminium and triisobutyl aluminium, particularly preferably n-butyl lithium, triethyl aluminium and triisobutyl aluminium.

Catalysts corresponding to general formula (II) include, for example: thioacetic acid amide, thiopropionic acid amide, thiobutyric acid amide, thiovaleriac acid amide, thiourea, N-methylthiourea, N-ethylthiourea, N,N-dimethylthiourea and thiosemicarbazide, particularly preferably thioacetic acid amide, thiourea and thiosemicarbazide.

Cocatalysts corresponding to general formula (III) include, for example: aliphatic acid amides such as dimethylacetamide, dimethylpropionic acid amide, cyclic amides such as pyrrolidone, valerolactam, caprolactam and N-methylpyrrolidone, particularly preferably dimethyl acetamide, N-methylpyrrolidone and caprolactam; cyclic amines such as piperazine, N,N'-dimethyl piperazine, bis-(2-hydroxy ethyl)-piperazine, 1,4-diazabicyclo(2,2,2)octane, 1,5-diazabicyclo(4,3,0)-non-5-ene and 1,5-diazabicyclo-(5,4,0)-undec-7-ene, particularly preferably 1,4-diazabicyclo-(2,2,2)-octane and 1,5-diazabicyclo-(5,4,0)-undec-7-ene; acyclic and cyclic ureas such as urea, N-methylurea, N-butylurea, N,N'-dimethylurea, N,N'-dibutylurea, N,N'-diphenylurea, N,N'-dimethylurea, tetramethylurea, N,N,N'-trimethylurea, ethyleneurea, N,N'-dimethylethyleneurea, N-phenylethyleneurea, propyleneurea, N,N'-dimethylpropyleneurea, 1,3-diazacycloheptanone-2, and 1,3-dimethyl-1,3-diazacycloheptanone-2, particularly preferably urea, N,N'-dimethylurea, ethyleneurea and N,N'-dimethylethylene urea.

Examples of cocatalysts corresponding to general formula (IV) include: propiolactone, butyrolactone, valerolactone and caprolactone, particularly preferably butyrolactone and caprolactone; cyclic ethers such as dioxane, 1,4,7,10-tetraoxacyclododecane, 1,4,7,10,13-pentaoxacyclopentadecane, 1,4,7,10,13,16-hexaoxacyclooctadecane, particularly preferably 1,4,7,10,13-pentaoxacyclopentadecane and 1,4,7,10,13,16-hexaoxacyclooctadecane.

Examples of cocatalysts corresponding to general formula (V) include: polyethylene glycol, polypropylene glycol, n-butanol, tert.-butanol, iso-octanol, n-dodecanol and n-octadecanol, particularly preferably polyethylene glycol and iso-octanol; thiols such as 2-mercaptoethanol, thiophenol, p-chlorthiophenol, n-butane thiol, n-dodecane thiol particularly preferably 2-mercaptoethanol and n-dodecane thiol.

In the process according to the invention, the suitable catalyst systems are preferably used as solutions.

In the process according to the invention, the catalyst systems are composed of from 50 to 99.999% by weight (based on the total weight of the catalyst system) of the cocatalyst corresponding to general formulae (III) to (V) and from 0.001 to 50% by weight (based on the total weight of the catalyst system) of the catalyst corresponding to general formulae (I) and (II); the catalyst systems are preferably composed of from 70 to 99.999% by weight of the cocatalyst and from 0.001 to 30% by weight of the catalyst, particularly preferably from 80 to 99.99% by weight of cocatalyst and from 0.01 to 20% by weight of catalyst.

In the process according to the invention, the catalyst systems are used in quantities of from 0.001 to 5% by weight (based on the weight of total monomer mixture), preferably from 0.01 to 4% by weight, particularly preferably from 0.01 to 3% by weight.

The temperatures at which the catalyst systems are used for ring-opening copolymerisation of monocyclic ring carbonates and difunctional cyclic carbonic esters in the process according to the invention are from 50° to 200° C., preferably from 70° to 170° C., particularly preferably from 80° to 160° C.

Suitable monocyclic carbonates in ring-opening copolymerisation include, for example: carbonates corresponding to general formula (VI)

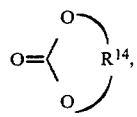

(VI)

wherein
R$^{14}$ represents (CH$_2$)$_n$ in which n=3–6, —CH$_2$CH═CHCH$_2$—, —CH$_2$CH$_2$CH(CH$_3$)—, —CH$_2$CH$_2$OCH$_2$CH$_2$OCH$_2$CH$_2$—,

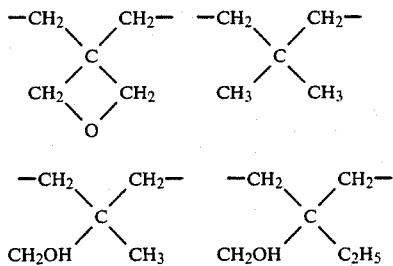

carbonates corresponding to general formula (VII)

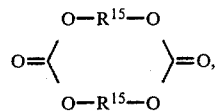

(VII)

wherein
R$^{15}$ represents (CH$_2$) in which n=4–12, —CH$_2$CH$_2$OCH$_2$CH$_2$—, —CH$_2$CH$_2$—O—CH$_2$CH$_2$—O—CH$_2$CH$_2$—,

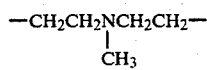

and the carbonate corresponding to general formula (VII)

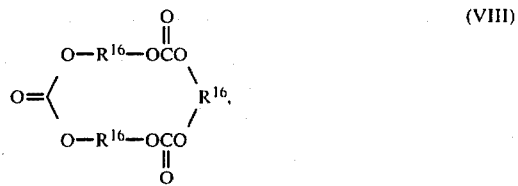

(VIII)

wherein
R$^{16}$ represents —CH$_2$CH$_2$OCH$_2$CH$_2$—.

The carbonates corresponding to general formula (VI) are preferably used.

Suitable difunctional ring carbonates having a cross-linking action in ring-opening polymerisation include, for example, carbonates corresponding to general formula (IX)

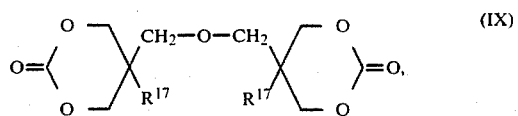

(IX)

wherein
R$^{17}$ represents an alkyl radical containing from 1 to 4 carbon atoms,
carbonates corresponding to general formula (X)

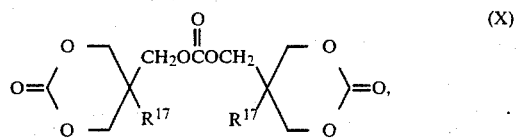

(X)

wherein
R$^{17}$ has the meaning given above,
carbonates corresponding to general formula (XI),

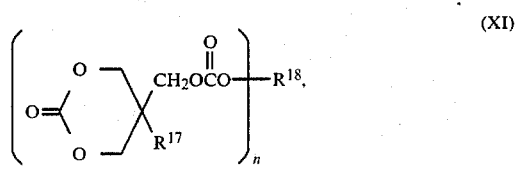

(XI)

wherein
R$^{17}$ has the meaning given above,
R$^{18}$ represents an alkylidene radical containing from 3 to 18 carbon atoms, an aryl radical containing from 6 to 12 carbon atoms or an aralkyl radical containing from 7 to 24 carbon atoms and
n represents 2, 3 or 4.

Carbonates corresponding to general formula (X) are preferably used.

In the process according to the invention, the difunctional ring carbonates having a cross linking action are added in quantities of from 2 to 50% by weight, preferably 5 to 20% by weight, based on the total quantity of carbonates used, to the monocyclic ring carbonate.

In the process according to the invention, the cyclic carbonates are polymerised in substance without using solvents by addition of the catalyst systems described above in the quantities specified above at the temperatures specified above.

The process according to the invention is carried out at normal pressure or at super pressure, preferably at normal pressure.

The use of the duromers obtained by the process according to the invention is indicated wherever high requirements are set on duromeric properties such as dimensional stability under heat and insensitivity to dissolving and swelling agents (for example motor fuels and lubricants) and wherever good mechanical properties, in particular high toughness, are also required. Examples include car parts, in particular those which are susceptible to being struck by stones, such as spoilers, bumper parts and mud guard linings.

EXAMPLES

Example 1 to 11

The catalyst system in the proportions and compositions specified below is added to a mixture of 90 parts of 5,5-dimethyl-1,3-dioxane-2-one (neopentylglycolcarbonate) and 10 parts of 5,5'-(carbonylbis-(oxy-methylene))-bis-(5-ethyl-1,3-dioxane-2-one) (X in which $R^{17}=C_2H_5$) at a monomer melt temperature of 120° C. After a short period (from 5 to 30 minutes) the initially liquid melts solidify to form clear polymers which are no longer deformable and have high toughness, elasticity and strength.

1. Catalyst system (1 part): lithium benzoate 5% in 1,5-diazabicyclo(5,4,0)undec-7-ene
2. Catalyst system (0.5 parts): potassium-tert.-butylate 10% in 1,5-diazabicyclo(5,4,0)undec-7-ene
3. Catalyst system (1 part): potassium-tert.-butylate 3% in caprolactam
4. Catalyst system (0.5 parts): potassium thiocyanate 10% in caprolactam
5. Catalyst system (1 part): potassium cyanide 5% in ethylene glycol
6. Catalyst system (0.05 parts): potassium-tert.-butylate 10% in dimethylacetamide
7. Catalyst system (0.5 parts): triisobutylaluminium 1% in ethylene glycol
8. Catalyst system (0.5 parts): thiourea 5% in 1,5-diazabicyclo(5,4,0)undec-7-ene
9. Catalyst system (0.5 parts): thioacetamide 5% in 1,5-diazabicyclo(5,4,0)undec-7-ene
10. Catalyst system (1 part): antimony(III)oxide 0.01% in 1,5-diazabicyclo(5,4,0)undec-7-ene
11. Catalyst system (1 part): lithiummethylcarbonate 2% in caprolactam

Example 12

A mixture of 72 parts of neopentylglycolcarbonate, 8 parts of 5,5'-(carbonylbis-(oxymethylene))-bis-(5-ethyl-1,3-dioxan-2-one) (X in which $R^{17}=C_2H_5$) and 0.8 parts of a catalyst system consisting of potassium tert.butylate (5% by weight) in caprolactam, is added to 20 parts of glass fibre at a temperature of 120° C. After a short period, a clear glass fibre-reinforced polymer is obtained.

Example 13

(comparison with DE-OS 3 103 135 and 3 204 078, in which thallium compounds are used for polymerisation of cyclic carbonates)

A mixture of 72 parts of neopentyl glycolcarbonate, 8 parts of 5,5'-(carbonylbis-(oxymethylene))-bis-(5-ethyl-2,3-dioxan-2-one) (X in which $R^{17}=C_2H_2$) and 0.2 parts of thallium(I)-acetate is added to 20 parts of glass fibre at 120° C. Hardening did not occur even after reaction times exceeding 2 hours.

Examples 14 and 15 demonstrate that a cocatalyst is required in the catalyst system.

Example 14

(comparison)

0.5 parts of lithium methylcarbonate are added to a mixture of 90 parts of neopentylglycol carbonate and 10 parts of 5,5'-(carbonylbis-(oxymethylene))-bis-(5-ethyl-1,3-dioxan-2-one) (X in which $R^{17}=C_2H_2$) at 120° C. A large proportion of the catalyst is encapsulated by a gel. The curing time is extended relative to Example 11 and the polymer is non-uniform.

Example 15

(comparison)

0.5 parts of thiourea are added to the monomer mixture from Example 14 at 120° C. Curing did not occur even after reaction times exceeding 1 hour.

We claim:

1. A process for the production of duromeric aliphatic polycarbonates by ring-opening copolymerization of monocyclic ring carbonates and difunctional ring carbonates having a cross linking action, characterised in that catalyst systems is a catalyst corresponding to formula (I)

$$X(R^1)_y \qquad (I),$$

in which
X is an ion from groups IA-IIIA, IIIB or VA of the periodic system,
$R^1$ is a $C_1$-$C_8$-alkylalcoholate, $C_7$-$C_{15}$-aralkylalcoholate, $C_4$-$C_{18}$-thiolate, cyanide, cyanate, thiocyanate, aliphatic ($C_1$-$C_8$)carboxylate, aromatic carboxylate, carbonate, $C_1$-$C_8$-alkyl carbonate, oxide, halide or $C_1$-$C_4$-alkyl radical,
Y represents 1, 2, 3 or 4
or a catalyst corresponding to formula (II)

$$R^2-\overset{S}{\underset{\|}{C}}-NH_2, \qquad (II)$$

wherein
$R^2$ represents $C_1$-$C_4$ alkyl, $-NH_2$, $-NH$-alkyl($C_1$-$C_4$), $-N(alkyl(C_1$-$C_4))_2$ or $-NHNH_2$
and a cocatalyst, selected from the group corresponding to one of formulae IIIa, aliphatic acid amides,

$$R^3-\overset{O}{\underset{\|}{C}}-NR^4R^5, \qquad (IIIa)$$

in which
$R^3$ represents $C_1$-$C_5$-alkyl,
$R^4$ and $R^5$ represent hydrogen or $C_1$-$C_4$-alkyl,
IIIb, cyclic amides

$$\begin{array}{c} R^4 \quad\quad O \\ | \quad\quad\quad \| \\ N\!-\!\!-\!\!-\!\!-\!\!-\!\!-\!C, \\ \diagdown_{(CH_2)_x}\diagup \end{array} \qquad (IIIb)$$

in which
$R^4$ has the meaning given for formula IIIa and

X represents an integer of from 3 to 6,
IIIc, cyclic amines

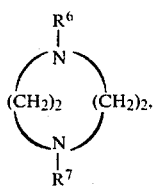 (IIIc)

in which
R$^6$ and R$^7$ represent hydrogen, —CH$_3$, —C$_2$H$_4$OH or together represent a saturated methylene chain containing from 2 to 4 carbon atoms,
IIId, bicyclic amidines

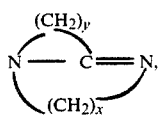 (IIId)

in which
X,Y represent an integer of from 2 to 5,
or IIIe, acyclic and cyclic ureas

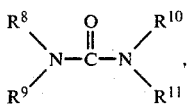 (IIIe)

in which
R$^8$ to R$^{11}$ represent hydrogen, C$_1$–C$_4$-alkyl, C$_6$–C$_{10}$-aryl and wherein also the nitrogen atoms be linked together to form a ring via two radicals R$^8$, R$^{10}$ or R$^9$, R$^{11}$ via a C$_2$ to C$_4$ chain, or general formula (IV)

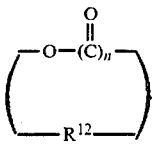 (IV)

wherein
R$^{12}$ represents —(CH$_2$)$_s$— in which s=2–5 when n=1 and —(CH$_2$CH$_2$O)$_t$CH$_2$CH$_2$— in which t=1–6 when n=0 and
n is 0 or 1,
or formula (V)

$$R^{13}-ZH \qquad (V),$$

wherein
R$^{13}$ represents —CH$_2$CH$_2$OH, —(CH$_2$CH$_2$)$_v$—OH,

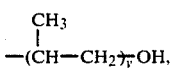

C$_4$–C$_{12}$-alkyl or a phenyl ring
v represents 1–200,
Z represents O and S,
are used.

2. A process according to claim 1 wherein polycarbonates produced are reinforced by inclusion of a filler during polymerization.

3. A process according to claim 1 wherein R$^1$ of the catalyst of formula (I) is an aromatic carboxylate substituted by bromo, chloro, alkyl having 1 to 4 carbon atoms, nitro, trifluoromethyl, alkoxy having 1 to 4 carbon atoms or carbalkoxy having 1 to 4 alkoxy carbon atoms.

4. A process according to claim 1 wherein R$^{13}$ of formula (V) is a substituted phenyl, substituted by bromo, chloro, alkyl having 1 to 4 carbon atoms, nitro, trifluoromethyl, alkoxy having 1 to 4 carbon atoms or carbalkoxy having 1 to 4 carbon atoms.

* * * * *